United States Patent [19]
Modone et al.

[11] Patent Number: 4,722,582
[45] Date of Patent: Feb. 2, 1988

[54] OPTICAL-FIBRE COUPLER

[75] Inventors: Eros Modone, Turin; Salvatore Morasca, Como, both of Italy

[73] Assignee: Centro Studi E Laboratori Telecomunicazioni S.p.A., Turin, Italy

[21] Appl. No.: 807,451

[22] Filed: Dec. 10, 1985

[30] Foreign Application Priority Data

Dec. 19, 1984 [IT] Italy ............................... 68260 A/84

[51] Int. Cl.[4] ............................ G02B 6/26; G02B 6/42
[52] U.S. Cl. ............................... 350/96.15; 350/96.18; 350/96.16
[58] Field of Search ............... 350/96.15, 96.16, 96.18, 350/416

[56] References Cited

U.S. PATENT DOCUMENTS

| | | | |
|---|---|---|---|
| 3,883,223 | 4/1974 | Hudson | 350/96 |
| 4,354,734 | 9/1982 | Nakahashi | 350/415 |
| 4,365,864 | 12/1982 | Cowley et al. | 350/96.16 |
| 4,461,278 | 3/1982 | Mori | 350/96.15 |

FOREIGN PATENT DOCUMENTS 76375  1/1980  Japan ............................... 350/96.16

*Primary Examiner*—Eugene R. LaRoche
*Assistant Examiner*—Michael B. Shingleton
*Attorney, Agent, or Firm*—Karl F. Ross; Herbert Dubno

[57] ABSTRACT

An optical coupler adapted to feed a plurality of optical fibers with light radiation coming from a single fiber or, conversely, to transmit to a single fiber the radiation coming from a plurality of fibers. A round paraboloid receives the optical beams condensed by hemispherical lenses placed in front of the fiber end faces and concentrates them on the end face of the output fiber through a hemispherical lens.

5 Claims, 3 Drawing Figures

OPTICAL-FIBRE COUPLER

FIELD OF THE INVENTION

The present invention relates to telecommunications systems using light radiation guided by transmission media and, more particularly to a coupler for optical fibers.

BACKGROUND OF THE INVENTION

A technical problem to be solved in optical-fiber interconnection is power distribution from a transmission medium to a plurality of media while keeping the coupling uniform and the power loss low. In the fact, while the loss in case of a coupler between two fibers only is basically due to imperfect alignment and to different optical-fibers characteristics, the coupling loss between one and a plurality of fibers can be also due to shaded zones. Owing to these, the optical power outgoing from a fiber is not entirely collected by the other fibers.

In addition a good coupler should keep the original light beam characteristics unchanged above all with respect to the modal distribution.

In other words, different order modes propagating into fibers should not be mixed. Mixing may cause, e.g., a distortion of transmitted optical pulses, in the case of multimode fibers, and an excitation of non-propagating modes in case of monomode fibers.

As to fabrication, the design and mechanical parts ought to be as simple as possible and the number of different materials used should be limited.

Finally the coupler should be insensitive to external mechanical strains, which could give rise to misalignment and hence power loss.

An optical coupler is described in "Advanced in ceramics. II Vol. Physics of fiber optics" by Kapany, edited by "The American ceramic society". This coupler couples a fiber to two other fibers, by exploiting power reflection operated by two hemispherical surfaces. These surfaces concentrate the radiation emitted by a fiber into the other two fibers.

This coupler, however, has a number of disadvantages, including:

optical-signal distortion due to different lengths of the optical paths joining different fibers and the various points of hemispherical surfaces;

impossibility of coupling more than two fibers without significant modifications in the geometric shape of reflecting surfaces; and sensitivity to mechanical vibrations as single fibers and reflecting surfaces undergo mutual oscillation.

In fact, to optimize the optical path it is necessary to leave a certain distance in the air between the fiber ends and the reflecting surfaces. As a consequence, the coupler can not be made in one piece.

Another coupling technique among a plurality of fibers consists of fusing a bundle of fibers duly prepared to obtain a zone where there is no core distinction. The fused zone is then drawn and possibly machined.

This coupler is difficult to make because of the preparation required for the single fibers, which must generally be deprived of their coatings, and in ensuring correct fusion of the whole.

In addition an inconvenience of this coupling is that it causes propagating modes to be mixed.

SUMMARY OF THE INVENTION

These disadvantages are overcome by the optical fiber coupler provided by the present invention, which allows the coupling between one and a multiplicity of fibers; it does not suffer from mechanical vibrations, being made in one pieces; it does not cause propagating modes to be mixed and is small sized (a 6-fiber coupler can be housed in a 4 mm side cube). Besides radiation intensity collected by each fiber can be varied by a suitable mask, thus obtaining an optical signal processing.

The coupler can be made by a technology similar to the one usually used for lenses.

The present invention provides a coupler for optical fibers, adapted to to send to a plurality of fibers the light radiation arriving from a single fiber or vice-versa to send to a single fiber the light radiation arriving from a plurality of fibers, which consists of:

a first glass part, having the geometrical shape of a round paraboloid, limited by a plane perpendicular to the axis, the curved surface being reflecting towards the paraboloid concavity;

a second glass part, shaped like a plate with two parallel and plane surfaces, in which hemispherical lenses are formed with their respective maximum circles lying on one of the plane surfaces; and a centering plate with at least one plane surface, perpendicularly to which optical fiber guides are provided.

The plane surface of the first part is soldered to the plane surface of the second part containing the maximum circles of the hemispherical lenses, in the position in which the center of one of the hemispherical lenses lies on the paraboloid axis, the other plane surface of the second part being soldered to the plane surface of the centering plate, with the guide axes passing through the centers of the hemispherical lenses.

BRIEF DESCRIPTION OF THE DRAWING

Further preferred details of the invention will appear from the following description given, by way of example, of an embodiment of the invention illustrated with reference to the accompanying drawing, in which.

Figure 1:
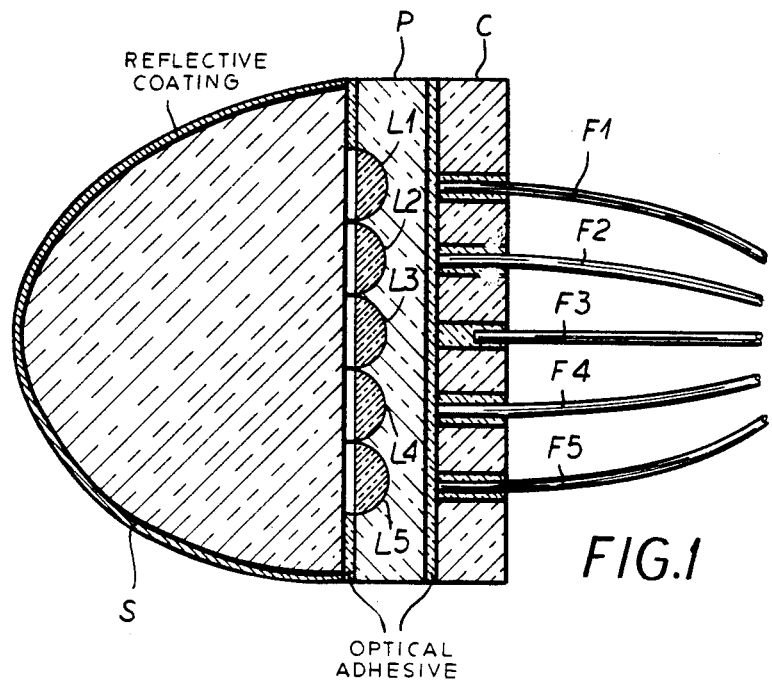
FIG. 1 is a longitudinal sectional view of the optical fiber coupler.

The coupler, shown in FIG. 1, consists of a first part made of glass, having the geometrical shape of a round paraboloid limited by a plane perpendicular to the axis. The external surfaces of the curved zone is rendered reflective towards the concavity of the paraboloid by deposition of a suitable material, e.g. silver, aluminum, etc.

A second part consists of a glass plate P, with plane and parallel surfaces wherein hemispherical lenses L1, ... L5 are obtained. Said lenses are preferably distributed along concentric circles, with their maximum circles lying on one of the plane surfaces of the plate.

This surface is soldered by suitable optical glue to the plane surface of the paraboloid.

Optical fibers F1, ..., F5, integral with plate P and held in a fixed position by a suitable centering plate C, are placed with their axes coincident with those of lenses. Plate C is provided with guides perpendicular to the surfaces and is soldered to plate P.

The thickness of plate P containing the lenses depends on the focal length of the lenses considered, since to optimize the radiation power entering and emerging from the fibers it is necessary to respect the optical system geometry.

Fiber F3, which has its axis coincident with the axis of the paraboloid, illuminates central semispherical lens L3 from a distance greater than the focal distance of the lens.

The paraboloid focus lies on image plane of fiber F3, while the paraboloid reflects the optical beam as a plane wavefront in turn condensed by the lenses on the single output fiber. The device can also operate inversely, i.e. the central fibers can act as a collector of the radiations coming from all the other fibers.

A possible device can comprise 19 fibers, one input fiber and 18 output fibers, arranged in numbers of 6 and 12 on two concentric circles.

Figure 2:
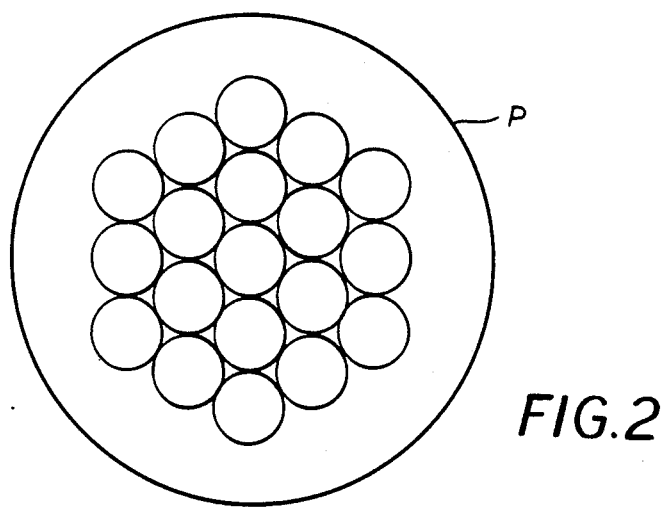
FIG. 2 shows the plate denoted by P in FIG. 1.

In this case the losses due to geometric factors can be reduced to a minimum value of 1.4 dB. Of course the losses decrease with the increase of the number of coupled fibers. In this case plate P can be made as in FIG. 2, with lenses symmetrically placed around the center.

Figure 3:
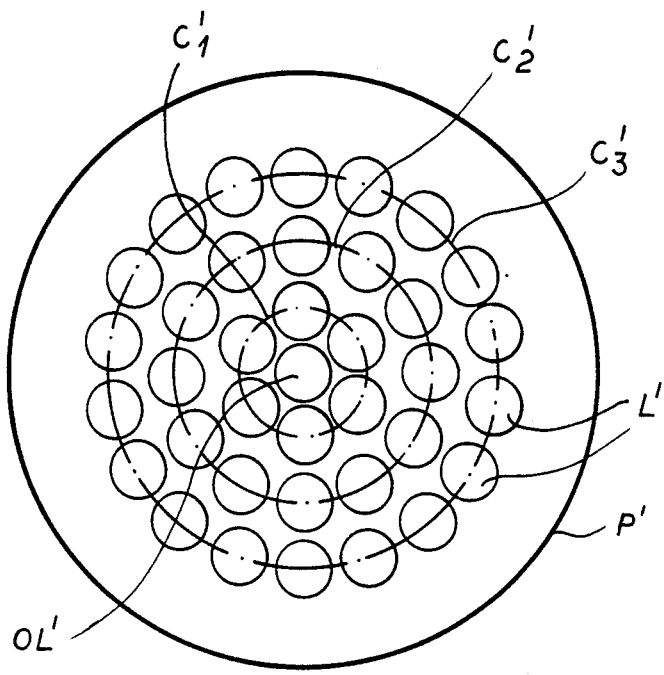
FIG. 3 is a view similar to FIG. 2 illustrating another embodiment.

A third circle would comprise a number of fibers which is twice as great as that of the fibers lying on the second circle, i.e. 24 fibers. Alternatively, (see FIG. 3) the lenses L' of the plate P' and hence the guides and fibers can lie on concentric circles $C_1'$, $C_2'$, $C_3'$ surrounding the lens OL' of the central output fibers.

At the present state of glass technology the coupler size and maximum fiber density mainly depend on lens sizes. A reduction of these improves the optical and geometric characteristics of the optical coupler.

A possible method of making hemispherical lenses exploits ion electrophoresis causing a refractive index variation in a kind of glass of suitable chemical composition. Plate P is masked according to a desired geometry and is immersed into a galvanic bath of the melt salt of the diffusing ion. Diffusion laws ensure the fabrication of hemispherical lenses with graded index. Such a method is described in "Stacked planar optics by the use of planar microlens array" by K. Iga et al. Proceedings of 10th ECOC '84—Sept. 3–6, 1984—Liederhalle, Stuttgart.

As an alternative the lenses can be directly obtained with ion implantation on the plane paraboloid surface, fabricating the whole coupler in one piece.

Variations and modifications to the above embodiments may be made without departing from the scope of the invention.

We claim:

1. A coupler for optical fibers adapted to selectively send light radiation between a single optical fiber and a plurality of optical fibers, said coupler comprising:
    a solid first glass body having an outer geometrical shape of a round paraboloid and delimited at an axial end opposite its curved paraboloidal end by a plane surface perpendicular to an axis of the paraboloid, the curved paraboloidal surface of said curved paraboloidal end being formed with a reflector oriented to reflect light arriving from off-axial locations at said plane surface toward said axis and toward said plane surface, and to reflect light arriving along said axis to off-axial locations and toward said plane surface;
    a plate-shaped second glass body fixed with said first glass body and delimited by two parallel and plane surfaces and formed with hemispherical lenses with respective maximum-lens-diameter circles lying on one of the plane surfaces of said second body, said one of said plane surfaces of said second body being conjoined with said plane surface of said first glass body so as to form an optical continuum therewith; and
    a centering plate fixed with said second glass body and provided with at least one plane surface, and a plurality of optical fiber guides terminating at said plane surface of said centering plate, said optical fiber guides and said plane surface of said centering plate being conjoined with the other of said plane surfaces of said second body so as to form an optical continuum therewith, said centering plate and said second glass body being so oriented that one of said optical fiber guides is axially aligned with one of said hemispherical lenses which lies along said axis of said first body, axes of the others of said guides passing through centers of respective others of said hemispherical lenses.

2. The coupler for optical fibers as defined in claim 1 wherein end faces of the optical fibers inserted into the guides of the centering plate are arranged so as to coincide with the foci of the respective hemispherical lenses except for the end face of the fiber lying on the paraboloid axis, whose distance from said one of said lenses exceeds the focal distance thereof.

3. The coupler for optical fibers as defined in claim 2 wherein the hemispherical lenses of the second body and the respective guides of the centering plate are arranged on concentric circles, whose centers lie on the paraboloid axis.

4. The coupler for optical fibers defined in claim 3 wherein at the center of said concentric circles a fiber is disposed, six fibers are disposed on a first inner circle, a number twice as great along a second circle outwardly of the first circle, and along a third circle outwardly of said second circle a number of fibers is placed which are twice as great as that of the second circle.

5. A coupler for optical fibers as defined in claim 1 wherein said first glass body is cemented by an optical adhesive to said second glass body, said second glass body is cemented with an optical adhesive to said centering plate and said centering plate is composed of glass.

* * * * *